United States Patent Office 3,154,599
Patented Oct. 27, 1964

3,154,599
RESINOUS COMPOSITIONS
Marco Wismer, Gibsonia, and Charles V. Semroc, Natrona Heights, Pa., assignors to Pittsburgh Plate Glass Company, Pittsburgh, Pa., a corporation of Pennsylvania
No Drawing. Filed May 4, 1961, Ser. No. 107,642
14 Claims. (Cl. 260—837)

This invention relates to new resinous compositions. More particularly this invention relates to blends of polymers of alpha,beta-unsaturated aldehydes or to the hemiacetal or full acetal of the said polymerized aldehydes and an epoxy resin, particularly a polyglycidyl ether of a polyhydroxy compound. The invention further relates to coating compositions which have been prepared from the said blends.

The unsaturated aldehydes, especially acrolein, have unusual chemical reactivity since both the unsaturated double bond and the aldehyde group are especially reactive. It is well known that acrolein polymerizes with itself or with one or more ethylenically unsaturated monomers to form a large variety of resins having a large cross section of properties.

Disacryl, which is heat polymerized acrolein and probably the first known polymer of acrolein, forms coatings which are chemical and solvent-resistant, but they are overly brittle. They are also difficult to apply as a coating because of the relatively insoluble nature of this polyacrolein.

By copolymerizing various vinyl monomers with acrolein and if desired cross-linking the copolymers with various polyols or other compounds which react with the residual aldehyde groups of the polymerized acrolein, it is possible to form extremely tough, flexible and solvent-resistant coatings which are fully cured at low temperatures. Novel methods of curing various acetals and hemiacetals of polyacrolein are disclosed and claimed in copending application Serial No. 141,625, filed September 29, 1961.

The resinous compositions formed from acrolein polymers may be used as coatings in a great many areas of utility. They have not, however, been widely accepted for use in white pigmented enamels nor for use as the unpigmented clear resin because the said resinous compositions suffer from "yellowing" when baked as a coating or when the coatings are exposed to moisture for a significant length of time.

It is readily understood that "yellowing" of coatings, especially those coatings which are to be used outdoors, is a serious problem since it restricts the use of the said coating from the vast majority of outdoor applications. "Yellowing" has particularly caused the acrolein resin compositions to be rejected as a coating composition for aluminum house siding because of the fact that a durable white finish is demanded for use therewith. Moreover, there are numerous other areas of utility to which the acrolein resin compositions are adaptable because the curing times are short and the curing temperatures are low; however, the said resinous compositions have not been exploited because of the "yellowing."

It has now been discovered that the "yellowing" of the above-mentioned resinous alpha,beta-unsaturated aldehyde polymer compositions, particularly the acrolein polymer compositions and the acetals and hemiacetals of the acrolein polymer compositions does not occur when the said resinous compositions are exposed to moisture if an epoxy resin, particularly a polyglycidyl ether of a polyhydroxy compound, is blended therewith.

This is surprising, since epoxy compounds have not been reported previously to prevent yellowing of polymeric substances except in the case of polyvinyl chloride when liberated HCl is reacted with the epoxy group. In this case, obviously a different mechanism must be involved.

The resinous blends of the instant invention may be made simply by admixing with or without the aid of solvent at least 5 percent by weight based on solids of a polyglycidyl ether of a polyhydroxy compound with either a homopolymer or copolymer of acrolein or the hemiacetal or acetal derivative of the homopolymer or copolymer of acrolein. The resinous blend is then mixed until homogeneous and reduced to a suitable viscosity for spraying or application by other methods.

The polymers of acrolein which may be used with the instant invention can be those prepared by various methods, for example, the various free radical initiated types such as those prepared by the use of oxygen containing catalysts, redox type catalysts and other free radical initiating methods such as by ultraviolet radiation or the above-mentioned application of heat. Moreover, in use of certain ionic initiating catalysts, more specifically anionic catalysts such as sodium formaldehyde sulfoxylate, it is important that the resulting polymer of acrolein, whether it be a copolymer or homopolymer thereof, contain a significant amount of free aldehyde groups. These free aldehyde groups provide reactive sites for cross-linking with itself or with other compounds capable of reacting therewith and therefore impart thermosetting characteristics.

As previously mentioned, it is desirable to obtain the polymer of acrolein or other unsaturated aldehyde in a soluble form so that it may conveniently be employed in various coating applications. It has been found that polymers of acrolein may be solubilized if they are reacted with monohydroxy alcohols to form the acetal (British Patent 797,459) or the hemiacetal of the free aldehyde groups. The various hemiacetals and acetals of the polymers of acrolein or other unsaturated aldehyde may then be admixed directly with the said epoxy resin and applied together with a catalyst as a coating composition to a surface. They are then cured at a temperature ranging from about 75° F. to about 550° F. and preferably at a temperature ranging from about 200° F. to 300° F.

The various copolymers which may be employed with the instant invention are those containing at least 5 percent and preferably 20 percent or more acrolein in polymerized form with at least one other monomer containing the $CH_2=C<$ group. Examples of such monomers include the following:

(1) Monoolefinic and diolefinic hydrocarbons, that is, monomers containing only atoms of hydrogen and carbon, such as styrene, alpha-methyl styrene, alpha-ethyl styrene, alpha-butyl styrene, isobutylene (2-methyl-propene-1), 2-methyl-butene-1, 2-methyl-pentene-1, 2,3-dimethyl-butene-1, 2,3-dimethyl-pentene-1, 2,4-dimethyl-pentene-1, 2,3,3-trimethyl-butene-1, 2-methyl-heptene-1, 2,3-dimethyl-hexene-1, 2,4-dimethyl-hexene-1, 2,5 - dimethyl - hexene - 1, 2-methyl-3-ethyl-pentene-1, 2,3,3-trimethyl-pentene-1, 2,3,4-trimethyl-pentene-1, 2-methyl-octene-1, 2,6-dimethyl-heptene-1, 2,6-dimethyl-octene-1, 2,3-dimethyl-decene-1, 2-methylnonadecene-1, ethylene, propylene, butylene, amylene, hexylene, butadiene-1,3, isoprene, and the like;

(2) Halogenated monoolefinic hydrocarbons, that is, monomers containing carbon, hydrogen and one or more halogen atoms, such as alpha-chlorostyrene, alpha-bromostyrene, 2,5-dichlorostyrene, 2,5-dibromostyrene, 3,4-dichlorostyrene, 3,4-difluorostyrene, ortho-, meta-, and para-fluorostyrenes, 2,6-dichlorostyrene, 2,6-difluorostyrene, 3-fluoro-4-chlorostyrene, 3-chloro-4-fluorostyrene, 2,4,5 - trichlorostyrene, dichloromonofluorostyrenes, 2- chloropropene, 2-chlorobutene, 2-chloropentene, 2-chlorohexene, 2-chloroheptene, 2-bromobutene, 2-bromoheptene, 2-fluorohexene, 2-fluorobutene, 2-iodopropene, 2-iodopentene, 4-bromoheptene, 4-chloroheptene, 4-fluoroheptene, cis and trans-1,2-dichloroethylenes, 1,2-dibromoethylene, 1,2-difluoroethylene, 1,2-diiodoethylene, chloroethylene (vinyl chloride), 1,1-dichloroethylene (vinylidene chloride), bromoethylene, fluoroethylene, iodoethylene, 1,1-dibromoethylene, 1,1-difluoroethylene, 1,1-diiodoethylene, 1,1,2,2-tetrafluoroethylene, 1,1,2,2-tetrachloroethylene, 1-chloro-2,2,2-trifluoroethylene;

(3) Esters of organic and inorganic acids, such as vinyl acetate, vinyl propionate, vinyl butyrate, vinyl isobutyrate, vinyl valerate, vinyl caproate, vinyl enanthate, vinyl benzoate, vinyl toluate, vinyl p-chlorobenzoate, vinyl-o-chlorobenzoate, vinyl m-chlorobenzoate and similiar vinyl halobenzoates, vinyl p-methoxybenzoate, vinyl o-methoxybenzoate, vinyl p-ethoxybenzoate, methyl methacrylate, ethyl methacrylate, propyl methacrylate, butyl methacrylate, amyl methacrylate, hexyl methacrylate, heptyl methacrylate, octyl methacrylate, decyl methacrylate, methyl crotonate, ethyl crotonate, and ethyl tiglate;

Methyl acrylate, ethyl acrylate, propyl acrylate, isopropyl acrylate, butyl acrylate, isobutyl acrylate, amyl acrylate, hexy acrylate, 2-ethylehexyl acrylate, heptyl acrylate, octyl acrylate, 3,5,5-trimethylhexyl acrylate, decyl acrylate, and dodecyl acrylate;

Isopropenyl acetate, isopropenyl propionate, isopropenyl butyrate, isopropenyl isobutyrate, isopropenyl valerate, isopropenyl caproate, isopropenyl enanthate, isopropenyl benzoate, isopropenyl p-chlorobenzoate, isopropenyl o-chlorobenzoate, isopropenyl o-bromobenzoate, isopropenyl m-chlorobenzoate, isopropenyl toluate, isopropenyl alpha-chloroacetate and isopropenyl alpha-bromopropionate;

Vinyl alpha-chloroacetate, vinyl alpha-bromoacetate, vinyl alpha-chloropropionate, vinyl alpha-bromopropionate, vinyl alpha-iodopropionate, vinyl alpha-chlorobutyrate, vinyl alpha-chlorovalerate and vinyl alpha-bromovalerate;

Allyl cyanide, allyl chlorocarbonate, allyl nitrate, allyl thiocyanate, allyl formate, allyl acetate, allyl propionate, allyl butyrate, allyl valerate, allyl caproate, allyl 3,5,5-trimethyl-hexoate, allyl benzoate, allyl trichloroacetate, allyl chloropropionate, allyl chlorovalerate, allyl lactate, allyl pyruvate, allyl aminoacetate, allyl acetoacetate, allyl thioacetate, as well as methallyl esters corresponding to the above allyl esters, as well as esters from such alkenyl alcohols as beta-ethyl allyl alcohol, beta-propyl allyl alcohols, 1-butene-4-ol, 2-methyl-butene-4-ol, 2(2,2-dimethylpropyl)-1-butene-4-ol, and 1-pentene-4-ol;

Methyl alpha-chloroacrylate, methyl alpha-bromoacrylate, methyl alpha-fluoroacrylate, methyl alpha-iodoacrylate, ethyl alpha-chloroacrlyate, propyl alpha-choloroacrylate, isopropyl alpha-bromoacrylate, amyl alpha-chloroacrylate, octyl alpha-chloroacrylate, 3,5,5-trimethylhexyl alpha-chloroacrylate, decyl alpha-chloroacrylate, methyl alpha-cyano acrylate, ethyl alpha-cyano acrylate, amyl alpha-cyano acrylate and decyl alpha-cyano acrylate;

Dimethyl maleate, diethyl maleate, dimethyl fumarate, diethyl fumarate, and diethyl glutaconate;

(4) Organic nitriles, such as acrylonitrile, methacrylonitrile, ethacrylonitrile, 3-octenenitrile, crotonitrile, oleonitrile, and the like;

In order to provide a coating composition which will have significant gloss subsequent to pigmentation and baking, it is strongly desirable that from about 0.5 percent to about 15 percent by weight of an unsaturated carboxylic acid be copolymerized in the acrolein polymer. It is preferred, however, that 1.5 percent to 3 percent by weight of the carboxylic acid be employed. Examples of unsaturated carboxylic acids which may be used include acrylic acid, methacrylic acid, crotonic acid, 3-butenoic acid, angelic acid, tiglic acid and the like.

U.S. Patent 2,657,192 discloses a process for the preparation of copolymers of acrolein with comonomers which may include all of the comonomers listed above. The polymeric compositions obtained by this process, including both the homopolymers and copolymers, are particularly valuable since they are recovered in stable solutions which may be mixed directly with the polyglycidyl ether of a polyhydroxy compound for use as coating compositions on various substrates including those composed of metal or glass, and particularly cellulosic materials such as wood and textiles.

The epoxy resins which may be employed in the resinous blends of the instant invention may vary considerably in structure. These materials, which are ordinarily polyglycidyl ethers of bisphenols, polyether derivatives of polyhydric phenols containing epoxide groups or the epoxy novolacs, are formed by the reaction of the polyhydroxy compound with epichlorohydrin, and range from viscous liquids to hard, brittle resins. The polyglycidyl ether of a polyhydric phenol is exemplified in the following structures. The following epoxy resins may be employed in amounts of at least 5 percent. Since the epoxy resins are universally compatible with the acrolein resins they may be used in any amount over 5 percent. There is, however, no advantage in blending more than 50 percent by weight of the epoxy resins with the acrolein resins; 10 percent to 30 percent by weight of the epoxy resin is preferred.

(I)
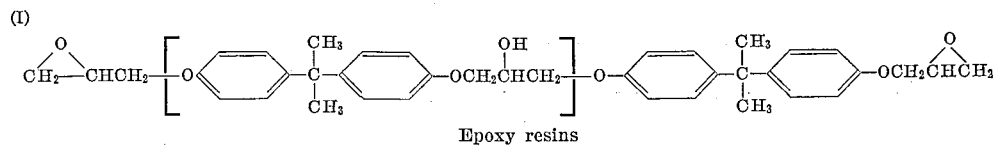
Epoxy resins (II)
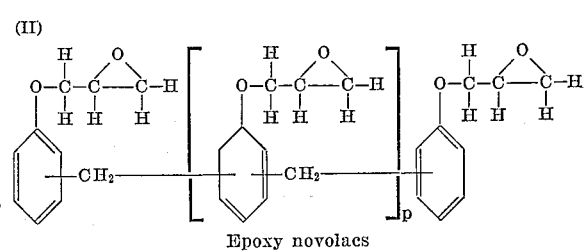
Epoxy novolacs

In the foregoing structure I, $n$ is a number of magnitude depending on the degree to which the etherification is carried, while $p$ of structure II is a number of magnitude depending on the degree of acidic catalyzed phenol formaldehyde condensation.

More complex epoxy resins such as those which result from a reaction of two or more moles of a diepoxide, or from the reaction of three or more moles of a diepoxide with one mole of a trihydric phenol, and diepoxides or polyepoxides derived from polyhydric alcohols such as sorbitol, 1,4-butanediol, pentaerythritol, or polyallyl alcohols, may also be used. Among the many phenolic compounds utilized in the preparation of epoxy resins are included the following:

Bis(4-hydroxyphenyl)2,2-propane
4,4'-dihydroxybenzophenone
Bis(4-hydroxyphenyl)1,1-ethane Bis(4-hydroxyphenyl)1,1-isobutane
Bis(4-hydroxyphenyl)2,2-butane
Bis(4-hydroxy-t-butylphenyl)2,2-propane
Bis(2-hydroxynaphthyl)methane
1,5-dihydroxynaphthalene The epoxy component of the epoxy resins may be selected from compounds of the following group:

1-chloro-2,3-epoxypropane (epichlorohydrin)
1-chloro-2,3-epoxybutane
1-chloro-3,4-epoxybutane
2-chloro-3,4-epoxybutane
1-chloro-2-methyl-2,3-epoxybutane
1-bromo-2,3-epoxypentane
2-chloromethyl-1,2-epoxybutane
1-bromo-4-methyl-3,4-epoxypentane
1-bromo-4-ethyl-2,3-epoxypentane
4-chloro-2-methyl-2,3-epoxypentane
1-chloro-2,3-epoxyoctane
1-chloro-2-methyl-2,3-epoxyoctane
1-chloro-2,3-epoxydecane The novolac-based epoxy resins are multi-functional and possess all of the desirable properties of conventional epoxy resins with the additional property of exceptionally high temperature performance. These resins have an average of 2.2 to 3.2 epoxy groups per molecule, thereby providing increased functionality over the standard polyglycidyl ethers of bisphenol, etc.

In addition to the above epoxy resins the glycidyl ethers of the aliphatic polyols may be used. Examples of these glycidyl ethers include the triglycidyl ether of trimethylolpropane.

As mentioned above, in many instances it may be desirable to add a polyol; that is, a polyhydroxy compound such as the various glycols, for example, hexamethylene glycol etc., and those containing more than two hydroxy groups such as sorbitol etc. and the hydroxyl-containing polyethers of the various polyols such as the Pluracols, the hydroxy containing compounds derived from amines may be used, such as the Tetronic series, and the various sucrose alkylene oxide reaction products.

In addition to the polyols, other compounds such as various polyester and alkyd resins, especially those containing active hydrogen atoms in the form of hydroxyl or carboxyl groups may be used.

Examples of other hydroxyl containing substances which may be used with resinous blends of the instant invention include the various polyacrolein derivatives or hydroxyl containing polyacrolein derivatives as described in U.S. Patent 2,809,186. The polyols are employed advantageously in amounts up to 35 percent by weight of the total resins solids.

Several types of catalysts may be employed with the instant invention. It has been found that mineral acids, organic acids, organo-substituted mineral acids and various metal halides, especially those classified as Lewis acids, promote or effect curing of the polyacrolein-epoxy resin blends.

Examples of mineral acids which are preferably used with the instant invention include phosphoric ($H_3PO_4$), hydrochloric acid and sulphuric acid. Typical examples of the organo-substituted mineral acids which may be used with the instant invention include p-toluenesulphonic acid, p-chlorotoluenesulphonic acid, chloromethyl phosphoric acid and the like. Examples of the metal halides include stannous chloride, ferric chloride, stannic chloride, zinc chloride and boron trifluoride and complexes such as $SnCl_2 \cdot HCl \cdot 6H_2O$. Examples of organic acids include perfluorosuccinic acid, trichloroacetic acid and oxalic acid. Amounts ranging from about 0.2 percent to about 5 percent by weight of the catalyst are preferred, but from .001 percent to about 50 percent by weight may be used.

While various and sundry compositions are conceivable within the scope of the instant invention, the preferred mode of the instant invention is set forth in the following examples. These examples are given by way of illustration and not by way of limitation. All parts and percentages are by weight unless otherwise specified.

EXAMPLE I

| | Parts by weight |
|---|---|
| Butanol | 400 |
| Acrolein | 100 |
| Ethyl acrylate | 70 |
| Styrene | 30 |
| Benzoyl peroxide | 2 |

The above ingredients were charged into a flask which was equipped with a stirrer, a condenser and a thermometer. The reaction mass was refluxed for 14 hours, after which 2 parts of benzoyl peroxide were added and refluxing was continued for 10 more hours. At the end of this time 200 parts of a mixture of butanol and unreacted monomers were removed at reduced pressure; 120 parts of butanol were then added. The resulting product had the following properties:

| | |
|---|---|
| Viscosity (Gardner-Holdt) | F |
| Solids (percent) | 26.4 |

EXAMPLE II

| | Parts by weight |
|---|---|
| Butanol | 400 |
| Acrolein | 100 |
| Methyl methacrylate | 100 |
| Benboyl peroxide | 2 |

The above ingredients were charged into a flask which was equipped with a stirrer, a condenser and a thermometer. The reaction mixture was then refluxed for 22½ hours. At the end of that time 200 parts of material, a mixture of butanol and unreacted monomers, were removed at reduced pressure. Twenty parts butyl cellosolve were added to the reaction mass. The resulting product had the following properties:

| | |
|---|---|
| Viscosity (Gardner-Holdt) | I |
| Solids (percent) | 37.9 |

EXAMPLE III

| | Parts by weight |
|---|---|
| Acrolein | 100 |
| Ethyl acrylate | 70 |
| Vinyl chloride | 30 |
| Butanol | 405 |
| Benzoyl peroxide | 4 |

The above ingredients were charged into a bomb which was cooled in a Dry Ice acetone bath. The bomb was then closed and immersed in a bath held at a temperature of 75° C. End-over-end rotation of the bomb in the bath was effected by suitable mechanism for 24 hours, after which the bomb was removed and cooled in a Dry Ice chest. The contents were a light brown liquid showing little viscosity. The excess monomers were allowed to evaporate; after 24 hours the resinous product had the following properties:

| | |
|---|---|
| Solids (percent) | 54.3 |
| Viscosity (Gardner-Holdt) | C |

EXAMPLE IV

The following example relates to the preparation of a copolymer of acrolein with ethyl acrylate in the presence of an alcohol using a free radical catalyst.

| | Parts by weight |
|---|---|
| Acrolein | 200 |
| Ethyl acrylate | 200 |
| Benzoyl peroxide | 4 |
| Butanol | 486 |

The above ingredients were charged into a flask which was equipped with a glass stirrer, a condenser and a thermometer. The reaction mass was refluxed for 8 hours after which was added 4 parts more of benzoyl peroxide. The refluxing was continued for 9½ more hours. The unreacted monomers were removed by vacuum and the resultant monomer-free polymer solution had the following properties:

Viscosity (Gardner-Holdt) _____ H
Solids (percent) _____ 32.2

EXAMPLE V

The following example relates to the preparation of an interpolymer of acrolein, ethyl acrylate, and acrylonitrile using a free radical catalyst.

| | Parts by weight |
|---|---|
| Butanol | 400 |
| Acrolein | 100 |
| Ethyl acrylate | 70 |
| Acrylonitrile | 30 |
| Benzoyl peroxide | 2 |

The above ingredients were charged into a flask which was equipped with a stirrer, thermometer and a condenser. The reaction mass was refluxed for 13 hours after which was added 2 parts more of benzoyl peroxide and the reaction mass was refluxed for another 4½ hours. At the end of this time, 250 parts of material consisting of solvent and the unreacted monomers were distilled at reduced pressure. The resulting product had the following properties:

Viscosity (Gardner-Holdt) _____ C
Solids (percent) _____ 22.6

EXAMPLE VI

| | Parts by weight |
|---|---|
| Acrolein | 300 |
| Ethyl acrylate | 300 |
| Acrylic acid | 30 |
| Butanol | 810 |
| Benzoyl peroxide | 6 |

The above ingredients were charged into a flask equipped with stirrer, condenser and thermometer. The reaction mass was refluxed for 6½ hours after which 6 parts more benzoyl peroxide were added to the reaction mass and refluxing was continued for 8½ hours. More benzoyl peroxide (3 parts) was added and refluxing was continued for 7 more hours. Then the excess monomers were removed at reduced pressure and the reaction mixture was adjusted with butanol to a solids content of 37 percent. The resinous composition had the following properties:

Viscosity (Gardner-Holdt) _____ V+
Acid value _____ 43

EXAMPLE VII

| | Parts by weight |
|---|---|
| Acrolein | 2112 |
| 2-ethylhexyl acrylate | 1056 |
| Ethyl acrylate | 2112 |
| Acrylic acid | 105.6 |
| t-Butyl hydroperoxide | 105.6 |
| Butanol | 9680 |

The above ingredients were charged into a flask equipped with stirrer, condenser and thermometer. The reaction mixture was then refluxed for 7 hours after which more t-butyl hydroperoxide (52.8 parts) was added to the reaction mass and refluxing was continued for 15 hours. The second addition of t-butyl hydroperoxide (52.8 parts) was made and the mixture was refluxed for 7 more hours. The reaction mass was then stripped of 4,420 parts of abutanol-unreacted monomer mixture.

EXAMPLE VIII

| | Parts by weight |
|---|---|
| Acrolein | 300 |
| Ethyl acrylate | 300 |
| Acrylic acid | 30 |
| Isopropyl alcohol | 785 |
| Benzoyl peroxide | 6 |

The above ingredients were charged into a flask equipped with stirrer, condenser and thermometer and refluxed for 15 hours. More benzoyl peroxide (6 parts) was added to the reaction mass which was refluxed for 9 more hours. The unreacted monomers were then removed at reduced pressure. The resinous composition had the following properties:

Viscosity (Gardner-Holdt) _____ H
Solids (percent) _____ 27
Acid value _____ 41.2

EXAMPLE IX

| | Parts by weight |
|---|---|
| Acrolein | 1200 |
| Methyl methacrylate | 1200 |
| Ethyl acrylate | 3480 |
| Acrylic acid | 120 |
| Benzoyl peroxide | 120 |
| Isopropyl alcohol | 7850 |

The above ingredients were charged into a flask equipped with stirrer, condenser and thermometer and refluxed for 25 hours after which more benzoyl peroxide (60 parts) was added with 235 parts of isopropyl alcohol. The reaction mass was then refluxed for 20 hours more and another addition of benzoyl peroxide (30 parts) was made. The reaction mass was then refluxed an additional 5 hours after vacuum distillation of residual monomers. The resinous product had the following properties:

Viscosity (Gardner-Holdt) _____ S
Solids (percent) _____ 50.2
Acid value _____ 7.31

EXAMPLE X

| | Parts by weight |
|---|---|
| Acrolein | 260 |
| Styrene | 260 |
| Methyl methacrylate | 260 |
| 2-ethylhexyl acrylate | 520 |
| Acrylic acid | 26 |
| Benzoyl peroxide | 26 |
| Ethyl Cellosolve | 343 |
| Xylene | 350 |
| Isopropyl alcohol | 1100 |

The above ingredients were charged into a vessel equipped with stirrer, condenser and thermometer and refluxed for 23 hours. The reaction mass was then adjusted to 47.5 percent solids using a 50:50 mixture of xylene and isopropyl alcohol. The resinous composition had a viscosity of N (Gardner-Holdt).

EXAMPLE XI

| | Parts by weight |
|---|---|
| Acrolein | 100 |
| Ethyl acrylate | 50 |
| Vinyl acetate | 30 |
| Butanol | 360 |
| Benzoyl peroxide | 3 |

The above ingredients were charged into a flask which was equipped with a stirrer, condenser, and a thermometer. The reaction mixture was then refluxed for 28½ hours. Then 200 parts of material were stripped from the reaction mixture and 80 parts of butanol were added. The resinous product had the following properties:

Viscosity (Gardner-Holdt) _____ C
Solids (percent) _____ 30.15

EXAMPLE XII

| | Parts by weight |
|---|---|
| Acrolein | 2400 |
| Ethyl acrylate | 2400 |
| Acrylic acid | 96 |
| Benzoyl peroxide | 96 |
| Butanol | 7128 |

The above ingredients were charged into a flask equipped with stirrer, condenser and thermometer. The reaction mixture was then refluxed for 5½ hours after which 24 parts of benzoyl peroxide were added to the reaction mass. The mixture was refluxed for another 8½ hours after which more benzoyl peroxide (48 parts) was added. The reaction mixture was then refluxed for 5 additional hours. In order to remove the unreacted monomers about 1180 parts of an azeotropic mixture containing unreacted monomers and butanol was removed and replaced by 810 parts of butanol. The reaction mass was further stripped of unreacted monomers by azeotropic distillation of about another 1950 parts and replaced by 1500 parts more of toluene. The resulting resinous composition had the following properties:

Viscosity (Gardner-Holdt) _____ J
Solids (percent) _____ 32.75
Acid value _____ 7.23

EXAMPLE XIII

This example relates to the preparation of a copolymer of acrolein with ethylhexyl acrylate, using a redox type catalyst.

Parts by weight
Acrolein _____ 100
Ethylhexyl acrylate _____ 100
Water (distilled) _____ 200
Potassium persulfate ($K_2S_2O_8$) _____ .91
Silver nitrate ($AgNO_3$) _____ .57

The above monomers were charged into a flask which was fitted with a glass stirrer, thermometer and a condenser. The silver nitrate was added and approximately one minute later the potassium persulfate was added. After 15 minutes of stirring, reaction had an exotherm and was cooled below 30° C. with the aid of a water bath. The product was then filtered and washed with distilled water ten times, dried in a vacuum at 60° C. The yield was 31 percent.

EXAMPLE XIV

Three hundred parts of the product of Example VII were refluxed with 100 parts of xylene in the presence of p-toluene sulphonic acid. The water was removed by azeotropic distillation and xylene was then removed until a solids content of 50 percent was obtained. After refluxing for 2 hours the full acetal of the said copolymer was obtained. The resinous product had the following properties:

Viscosity (Gardner-Holdt) _____ W+½
Solids (percent) _____ 50.2
Acid number _____ 11.7
Color (Gardner) _____ 7

EXAMPLE XV

A pigment paste was prepared as follows:

Parts by weight
Titanium dioxide pigment (rutile) _____ 4500
Product of Example XII _____ 450
Toluene _____ 900

The above ingredients were charged into a ball mill and ground for 16 hours. The mill was opened and 1230 parts more of the product of Example XII were added and the ingredients were ground for another 2 hours.

The following tables contain enamel compositions with and without epoxy resins and are used to clearly illustrate the anti-yellowing effect of the said epoxy resins.

*Table I*

| Examples | A | B | C | D | E | F | G | H |
|---|---|---|---|---|---|---|---|---|
| Pigment paste of Example XV | 70.8 | 70.8 | 70.8 | 70.8 | 70.8 | 70.8 | 70.8 | 70.8 |
| Resinous composition of Example XII | 194 | 166.3 | 148.7 | 127.6 | 148.7 | 127.6 | 168.6 | 150.5 |
| Zinc chloride solution (10 percent zinc chloride ethyl alcohol solution) | 6.75 | 6.75 | 6.75 | 6.75 | 6.75 | 6.75 | 6.75 | 6.75 |
| Epon 1001 epoxy resin** | | 9.1 | | 9.1 | | 9.1 | | 9.1 |
| Epoxide oil (Paraplex G-60***) | | | 15.5 | 15.5 | | | | |
| Polyester resin* | | | | | 20.7 | 20.7 | 10.8 | 10.8 |

*Made from adipic acid (834 parts), phthalic anhydride (573 parts), 1,3-butanediol (793 parts) and trimethylolethane (448 parts).
**Solid reaction product of bisphenol A and epichlorohydrin having an epoxide equivalent of 450 to 525.
***Low viscosity polymeric epoxidized soybean oil plasticizer.

The above compositions were thinned with xylene and sprayed on phosphatized steel panels (Bonderite 1000) and cured for 30 minutes at 250° F. The baked samples were then put in water, soaked for 160 hours, removed and observed for "yellowing." The results were as follows:

| Example | Result |
|---|---|
| A | Slight yellowing. |
| B | Total absence of yellowing. |
| C | Slight yellowing. |
| D | Total absence of yellowing. |
| E | Slight yellowing. |
| F | Total absence of yellowing. |
| G | Extreme yellowing. |
| H | Total absence of yellowing. |

*Table II*

| | Parts by Weight | | | | | | | |
|---|---|---|---|---|---|---|---|---|
| | I | J | K | L | M | N | O | P |
| Resinous composition of Example XIV at 100 percent solids | 7.6 | 7.6 | 7.6 | 7.6 | 7.6 | 7.6 | 7.6 | 7.6 |
| Epoxy resin (Epon 1001) | | | 1.0 | 0.5 | 1.0 | 0.5 | 2.0 | 2.0 |
| Allyl alcohol-styrene copolymer (Shell X450) | 1.0 | 1.0 | 1.0 | 1.0 | 1.0 | 1.0 | 1.0 | 1.0 |
| 10 percent phosphoric acid ($H_3PO_4$) solution (ethyl alcohol) | 0.76 | | 0.76 | 0.76 | | | 0.76 | |
| 10 percent zinc chloride ($ZnCl_2$) solution (ethyl alcohol) | | 0.76 | | | 0.76 | 0.76 | | 0.76 |

The above compositions (Examples I through P) were reduced to a suitable spraying viscosity and sprayed on phosphatized steel panels (Bonderite 1000) and baked for 30 minutes at 350° F. The panels were then observed for yellowing. The results were as follows:

| Example | Results |
|---|---|
| I | Substantial yellowing. |
| J | Yellowing. |
| K | Colorless. |
| L | Do. |
| M | Do. |
| N | Do. |
| O | Do. |
| P | Do. |

In addition to overcoming the problem of yellowing of the coating compositions containing polymers of acrolein or other alpha,beta-ethylenically unsaturated aldehydes, various other improvements may be appreciated from the additions of the polyglycidyl ethers of hydric compounds therewith. When the epoxy resin content reaches the level of about 25 percent of the total resins solids the alkali resistance is greatly improved. For example, when a steel panel (Bonderite 1000) is coated with a clear film of the resinous product of Example XII, baked for 30 minutes at 250° F. and placed in a 2 percent NaOH solution, the film is attacked after 1.5 hours and completely destroyed after 20 hours. A film on a steel panel (Bonderite 1000) comprising the same resin but containing about 23 percent of an epoxy resin (Epon 1001) remained free from attack after 20 hours.

Salt spray resistance is also enhanced by the addition of about 10 percent of the epoxy resin to the acrolein polymer compositions.

Table III

| | Q | R | S | T |
|---|---|---|---|---|
| Acrolein-styrene copolymer (Shell's Ex-39 polyaldehyde) | 3.4 | 3.4 | | |
| Acrolein-styrene copolymer (Shell's Ex-40 polyaldehyde) | | | 3.4 | 3.4 |
| Polyol (allyl alcohol styrene copolymer, Shell's X450) | 1.0 | 1.0 | 1.0 | 1.0 |
| Epoxy resin (glycidyl ether of bis (4-hydroxy phenyl)2,2-propane, Epon 1001) | | 1.0 | | 1.0 |
| $ZnCl_2$ | .034 | .034 | .034 | .034 |

The compositions of Table III (Examples Q through T) were reduced to a suitable spraying viscosity and sprayed on phosphatized steel panels (Bonderite 1000) and baked for 30 minutes at 250° F. The panels were then observed for "yellowing." The results were as follows:

| Example | Results |
|---|---|
| Q | Yellow. |
| R | Substantially colorless. |
| S | Yellow. |
| T | Colorless. |

The acrolein styrene copolymers EX-39 and EX-40 employed in Examples Q, R, S and T have the following properties:

Table IV

| | EX-39 | EX-40 |
|---|---|---|
| Molecular weight | 1,100 | 1,900. |
| Softening point Durrans (° C.) | 109 | 127. |
| Carbonyl value, Eq/100 grams. | 6.45 | 0.42. |
| Average number of carbonyl groups per mol. | 4.9 | 8.0. |
| Hydroxyl value, Eq/100 grams. | 0.17 | 0.01. |
| Iodine value, Eq/100 grams. | 37 | 84. |
| Solubility | Soluble in: Acetone, Benzene, Toluene, Dioxane, Chloroform, Pyridine. | Insoluble in: Methanol, Ethanol, Cyclohexane. |

It has been found that certain other oxirane and epoxide compounds tend to overcome the yellowing effect of the acrolein in the polymeric film compositions but that they tend to downgrade the basic properties of the coating or film. Examples of some epoxide compounds which fall within this class are disclosed in U.S. Patent 2,890,144.

While specific examples of the invention have been described hereinabove, it is not intended to limit the invention thereto, but to include all of the variations and modifications which are within the scope of the appended claims.

We claim:

1. A resinous composition comprising (1) a polymer containing from about 5 percent by weight to 100 percent by weight of at least one member of the class consisting of acetals and hemiacetals of an alpha,beta-ethylenically unsaturated aldehyde and from about 95 percent to 0 percent by weight of at least one other monomer containing a $CH_2{=}C{<}$ group, (2) a glycidyl ether of a polyhydroxy compound, and (3) a catalyst selected from the group consisting of mineral acids, organic acids, organo-substituted mineral acids, metal halide and Lewis acids.

2. The resinous composition of claim 1 wherein there is included a polyol.

3. The resinous compound of claim 1 wherein the glycidyl ether is obtained by the reaction of bis(4-hydroxyphenyl)2,2-propane with epichlorohydrin.

4. The resinous composition of claim 1 wherein the glycidyl ether is a polyglycidyl ether having an average of more than two epoxy groups per molecule.

5. The resinous composition of claim 1 wherein the glycidyl ether is a polyglycidyl ether of trimethylolpropane.

6. The composition of claim 1 wherein the unsaturated aldehyde is acrolein, and said polymer contains from about 0.5 to about 15 percent by weight of an unsaturated carboxylic acid and at least one other monomer containing a $CH_2{=}C{<}$ group.

7. The composition of claim 6 wherein the said other monomer is ethylacrylate.

8. The composition of claim 6 wherein the said other monomer is styrene.

9. The composition of claim 6 wherein the said other monomer is acrylonitrile.

10. The composition of claim 6 wherein the said other monomer is vinyl halide.

11. The composition of claim 6 wherein the said other monomer is methyl methacrylate.

12. The composition of claim 6 wherein the said other monomer is 2-ethylhexyl acrylate.

13. The composition of claim 6 wherein there is included a polyol.

14. The composition of claim 13 wherein the said polyol is a polyester.

References Cited in the file of this patent
UNITED STATES PATENTS 2,895,945 Fischer et al. _____ July 21, 1959
3,008,914 Fry _____ Nov. 14, 1961